United States Patent [19]
Emerson

[11] 3,777,485
[45] Dec. 11, 1973

[54] VAPORIZED FLUID POWERED ENGINE

[75] Inventor: Christopher Plummer Emerson, Lamoni, Iowa

[73] Assignee: The Deskin Corporation, Lamoni, Iowa

[22] Filed: Mar. 8, 1972

[21] Appl. No.: 232,780

[52] U.S. Cl............................ 60/95, 60/106, 60/107, 60/108, 62/243, 122/35, 122/448 R, 122/448 B
[51] Int. Cl........................ F01k 25/10, F25b 27/00
[58] Field of Search.................. 60/105, 36, 108 R, 60/.95 R; 122/448 R, 448 B, 35

[56] References Cited
UNITED STATES PATENTS

| | | | |
|---|---|---|---|
| 1,328,593 | 1/1920 | Ruths | 122/35 |
| 1,819,619 | 8/1931 | Page et al. | 122/35 X |
| 2,035,726 | 3/1936 | Sheldon | 60/108 R |
| 2,110,468 | 3/1938 | Metzner | 60/108 R X |
| 2,676,574 | 4/1954 | Wenzel | 60/107 X |
| 2,780,206 | 2/1957 | Rocque | 122/448 B |
| 3,452,722 | 7/1969 | Evers | 122/448 R |

FOREIGN PATENTS OR APPLICATIONS

| | | | |
|---|---|---|---|
| 3,766 | 12/1872 | Great Britain | 60/36 |
| 222,867 | 4/1925 | Great Britain | 122/35 |

Primary Examiner—Edgar W. Geoghegan
Assistant Examiner—Allen M. Ostrager
Attorney—Morton S. Adler

[57] ABSTRACT

An apparatus and method for converting heat energy to mechanical energy in a closed circuit power unit by alternately expanding and vaporizing and then condensing a working fluid to product a pressure differential utilized to operate a reciprocal engine component such as a piston or diaphragm. The apparatus includes an improved and simplified engine component efficiently operated by the pressure differential resulting from the heating and cooling of the working fluid and also includes a series of non-simultaneously operating combination fluid heat generators and condensors to maintain a continuously available source of heat and cooling for acting on the working fluid. This invention is illustrated in association with a motor vehicle air conditioning system where the heated fluid in the normal engine cooling system is utilized to provide heat to the working fluid heat generators in a controlled sequence whereby the heat energy created is utilized to operate the engine component which in turn is coupled to the compressor unit of the air conditioning system or which may otherwise be connected to any other appropriate work load. This new engine is also operable by any other suitable source of heat.

12 Claims, 4 Drawing Figures

VAPORIZED FLUID POWERED ENGINE

BACKGROUND OF THE INVENTION

This invention relates to an improved engine apparatus and method for converting heat energy of a working fluid in a closed power unit to mechanical energy by applying a source of normally waste heat energy to a working fluid within a closed circuit. It can be most advantageously utilized in the art of refrigeration and is shown here for purposes of illustration in a vehicle air conditioning system where the compressor unit in such system is operated by a closed circuit engine unit deriving its power from a pressure differential of a working fluid supplied with heat from the water circulation system of the vehicle. This new apparatus and method may also be used with an air conditioning system other than in association with a motor vehicle when any suitable source of heat is available and independently of any air conditioning association, the engine of this invention can be used as a source of power for driving other selected work loads.

The conversion of heat energy to mechanical energy in the refrigeration art is not new as illustrated in U.S. Pat. Nos. 2,486,034, 2,511,716 and 3,531,933 and the use of particular working fluids for such purpose is disclosed in U.S. Pat. Nos. 3,512,357 and 3,292,366. In U.S. Pat. Nos. 3,589,436 and 3,315,466 there is shown the utilization of exhaust heat as the source of heating a working fluid. The use of a pump means to circulate various types of working fluids including Freon which I have preferably used, appears to be a common characteristic of these prior disclosures and because of the susceptibility of such fluids to expansion and retraction with accompanying pressure changes, it is apparent that many problems are present necessitating rather elaborate and complicated apparatus in the pumping assemblies. Also, some systems provide a source of heat in the form of boilers with elaborate valving controls and others suggest the use of various extraneous heating elements applied to flow conduits at selected points throughout the system.

In the present invention, I have overcome the several disadvantages of prior systems which convert heat energy to mechanical energy and have provided a new and simplified improved engine with a minimum of parts that can be hermetically sealed within a closed circuit which includes a selected working fluid together with a heat generating and condensing arrangement applied to the working fluid so that it will circulate under pressure differentials without the need for any pumping apparatus and as a result of such circulation will efficiently operate the engine component.

One of the important objects of this invention is to provide an engine for operating the regular compressor in an air conditioning system and particularly in the case of a motor vehicle air conditioner, to provide that such engine will operate solely on pressure differentials of the working fluid created by the application of heat which is obtained from the normally circulating fluid in the vehicle cooling system and thereby permit operation of the air conditioner without requiring any connection to or applying any load upon the vehicle engine whether the vehicle is in motion or at a standstill so long as the vehicle's normal engine cooling system is functioning.

Another object herein is to provide an improved heat and condensing assembly relative to the closed circuit in which the working fluid is contained.

A further object is to provide a new engine as characterized which can be independently used as a source of power to operate selected driven components and which is actuated by pressure differentials of a working fluid supplied by heat in any suitable manner.

SUMMARY

The engine of this invention comprises a cylinder housed reciprocating piston connected to a constant pressure from an expanded working fluid which moves in alternate directions through flow lines communicating at opposite ends of the cylinder to effect reciprocation of the piston that in turn discharges the working fluid for movement through condensing conduits and into a combination heat generator and condensing assembly which is supplied with heat from any suitable source for re-expanding the working fluid to provide the pressure necessary for the engine. The expanded working fluid is stored in an insulated receiver tank under a predetermined pressure and is released to the engine at a constant pressure through appropriate valving. This entire unit is in a hermetically sealed closed circuit, requires no belts, pulleys, clutches or gears and is relatively noiseless. This engine may be used to power various driven components and has special utility in air conditioning systems where the compressor piston can be directly or integrally connected to the engine piston. In motor vehicle air conditioners, the heat applied to the working fluid is normally waste heat obtained by placing suitable water jackets around the heat generators and connecting them to the engine cooling system of the vehicle.

These and other objects of this invention together with details of its construction and use as outlined and the advantages of the same will be more fully described and developed in relation to the more detailed description of the accompanying drawings.

DESCRIPTION OF THE PREFERRED EMBODIMENTS

Figure 1:
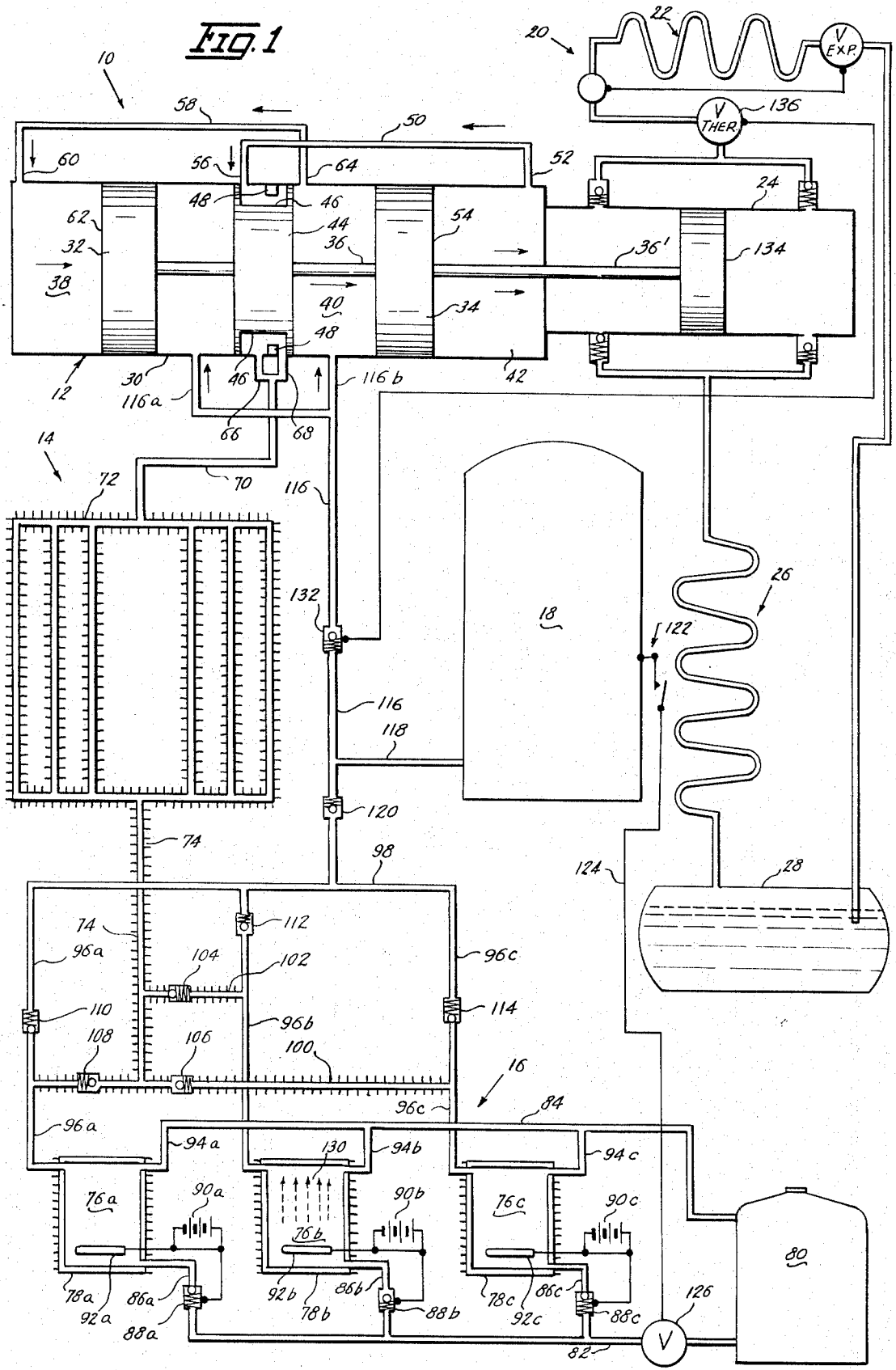
FIG. 1 is a schematic illustration of this invention shown in relation to a motor vehicle air conditioning system.

Referring to the drawings and particularly to FIG. 1, my new engine assembly is designated generally by the numeral 10 and includes the engine component 12, condensing tube assembly 14, the combination heat generator and condensor assembly 16 and an insulated receiver 18 of which all will be described in more detail as this description proceeds. While this engine assembly 10 is designed for converting heat energy to mechanical energy for any given work load, the particular work load shown to illustrate the operation of this engine is in the form of a vehicle air conditioning unit designated generally by the numeral 20 and including the usual components of an evaporator 22, a compressor 24, a condensor 26 and a receiver 28 which function in a well known manner and for which no invention is claimed in this application and it will be understood that is is not intended that the engine assembly 10 is to be limited to this particular type of work load.

The engine component 12 comprises a cylindrical housing 30 in which there is mounted for reciprocation the spaced pistons 32 and 34 connected by rod 36 whereby there is formed the respective chambers 38, 40 and 42. Within chamber 40, there is the hollow sleeve 44 suitably connected to rod 36 so that it will be moved correspondingly within housing 30 by the movement of pistons 32 and 34 as will appear. Sleeve 44 is provided with the peripheral notch or groove 46 and projecting from the inner surface of housing 30 is the annular rib or bead 48 which serves as a stop as will be described and is disposed within the confines of the groove 46.

Flow communication means between the several compartments of engine assembly 12 are provided as follows. Conduit 50 connects at one end 52 near the outer extremity of chamber 42 relative to the outer face 54 of piston 34. The other end 56 of conduit 50 communicates with chamber 40. A second conduit 58 communicates at one end 60 with the outer end of chamber 38 relative to the outer side 62 of piston 32. The other end 64 of conduit 50 communicates with chamber 40 in spaced relationship to conduit end 56 of conduit 50 whereby the reciprocation of sleeve 44 will alternately place groove 46 into and out of registration with the respective conduit ends 56 and 64. Also, relative to housing 30 generally diametrically disposed to the conduit ends 56 and 64 is a pair of spaced conduits 66 and 68 which converge into a single conduit 70 that in turn connects to any suitable arrangement of a series of finned condensing tubes 72. Flow communication from condensing tube assembly 14 to the combination heat generator and condensor assembly 16 is provided by conduit 74 and will be better understood by a more detailed description of assembly 16 as follows.

A plurality of like containers designated by the numerals 76a, 76b and 76c are designed to hold a suitable working fluid as will later be referred to. Each of the containers 76a, 76b and 76c are encased in a closed circuit water jacket means 78a, 78b and 78c which are each connected to a source of hot water circulation as follows. As seen in FIG. 1, the source of hot water circulation is illustrated in relation to a vehicle represented by the vehicle radiator 80 having the outgoing water line 82 and the incoming water line 84. It will be understood that circulation of fluid through lines 82 and 84 is afforded by the vehicle water pump (not shown) so that no auxiliary pumping apparatus is required for such circulation. The water pumped through line 82 is directed to the respective containers 76a, 76b and 76c by the respective conduits 86a, 86b and 86c and in each of said lines, 86a, 86b and 86c are the respective solenoid valves 88a, 88b and 88c which are connected for operation through respective circuits 90a, 90b and 90c having the respective temperature sensing devices 92a, 92b and 92c in the respective containers 76a, 76b and 76c as shown. Each of the water jackets 78a, 78b and 78c are connected to the return water flow line 84 by the respective conduits 94a, 94b and 94c. Thus far described with relation to assembly 16, it will be understood that the flow of hot water from line 82 through the respective water jackets 78a, 78b and 78c and back through line 84 will provide a supply of normal waste heat from the vehicle water circulation system to the respective containers 76a, 76b and 76c and the details of this operation will be later explained. Respective conduits 96a, 96b and 96c connect to the respective containers 76a, 76b and 76c to provide two way flow as will appear and said conduits 96a, 96b and 96c are connected across their ends by conduit 98 and are also connected intermediate their ends by conduit 190. Line 74 from the condensing tubes 72 connects into line 100 which, as seen in FIG. 1, provides flow communication through the respective conduits 96a, 96b and 96c into the respective containers 76a, 76b and 76c. A further conduit 102 connects conduit 74 to conduit 96b and is provided with the check valve 104. Other check valves include 106 in line 100 between lines 74 and 96b, 108 in line 100 between lines 74 and 96a, 110 in line 96a between lines 98 and 100, 112 in line 96 between lines 102 and 98 and 114 in line 96c between lines 98 and 100. These several valves and their respective functions will be further described in the description of the operation of this invention when the description of the several parts has been completed. Conduit 116 connects at one end to conduit 98 that is in communication with the respective containers 76a, 76b and 76c through thr respective conduits 96a, 96b and 96c and at its other end is bifurcated to form conduits 116a and 116b which communicate with chamber 40 of the engine component 12 on respective opposite sides of the sleeve 44. A two way flow conduit 118 connects line 116 to the insulated receiver 18 and intermediate 118 and 98 is the check valve 120. Connected to receiver 18 is a pressure regulating switch 122 connected as at 124 to a master valve 126 in the outgoing water line 82 from radiator 80.

OPERATION

Thus far described, the operation of this new engine can be explained without regard to any particular work load to which it is applied although an illustrative load in the form of the air conditioning unit 20 will be later referred to.

Figure 2:
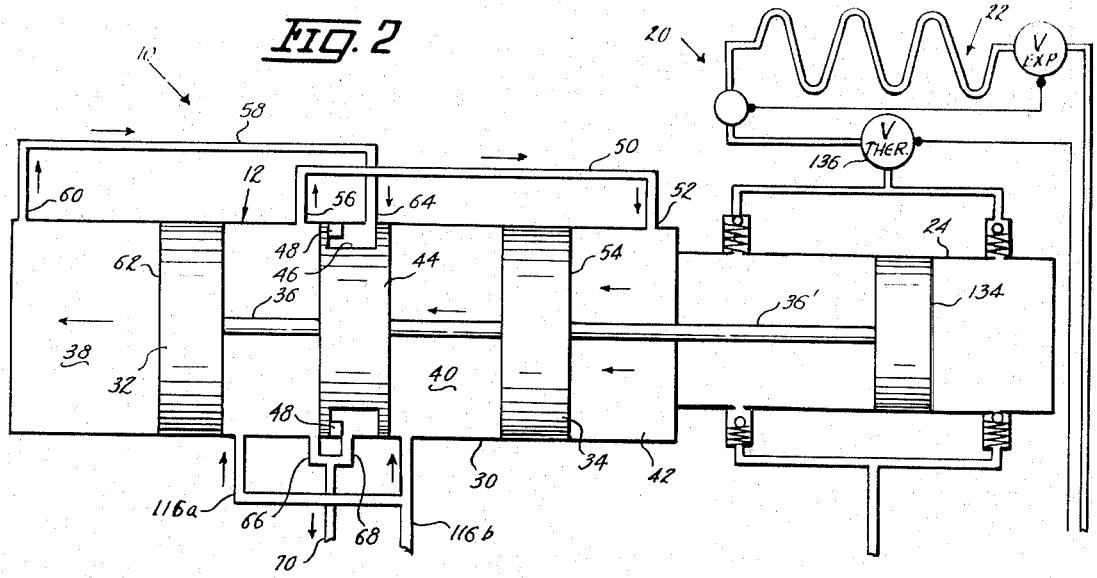
FIG. 2 is a schematic illustration of the engine and compressor components in FIG. 1 but showing the piston assembly in the opposite direction of travel to that shown in FIG. 1.
Figure 3:
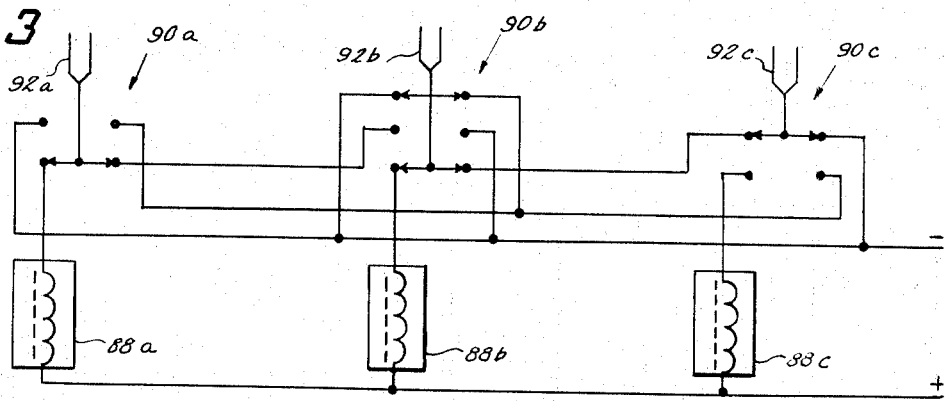
FIG. 3 is a wiring diagram for the combination heat generators and condensors shown in FIG. 1.
Figure 4:
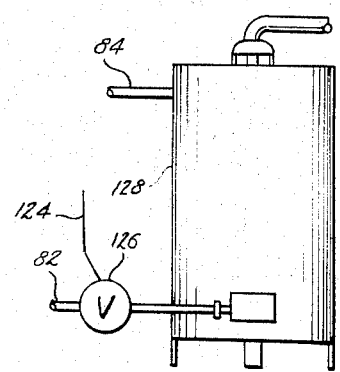
FIG. 4 is a schematic drawing indicating a source of hot water for supplying heat to the heat generators in the form of a boiler or hot water tank as may be found in a building.

The closed circuit of engine assembly 10 includes the engine component 12, the condensing tube assembly 14, the combination heat generator and condensor component 16 together with the receiver 18, the several flow conduits and flow communication means interconnecting the same as described and the separate closed circuit source of hot water circulation. This closed engine circuit, and excluding the circuit of hot water supply, will initially be filled with approximately ten pounds of a suitable working fluid for which I have selected Freon 22 although it will be understood that any other suitable working fluid may be employed. For purposes of explanation, it is assumed that valve 126 is open to permit the circulation of hot water at approximately 180° F. out through line 82 and back through line 84 to the radiator 80, or in any installation not directly connected with a motor vehicle, with any suitable source of the hot water such as a boiler 128 as seen in FIG. 4. Also, it is assumed that while there will be a certain amount of Freon in the containers 76a, 76b, and 76c which each alternately serve as both heat generators and condensors, that container 76b is serving as the heat generator for purposes of this explanation whereby valves 88a and 88c will be closed so that no hot water will reach containers 76a and 76c and valve 88b will be open so that hot water is passing through the water jacket 78b whereby liquid Freon in 76b will be converted into a high pressure gaseous state as represented by the numeral 130. In this situation, the closed position of valve 88b and the open position of valves 88a and 88c is illustrated in the wiring diagram of FIG. 3. As the Freon 130 in container 76b is heated and vaporized it will move out of container 76b in conduit 96b whereby the pressure will open valve 112 so that the gas will disburse in conduit 98 and into conduit 96 where the pressure will close valve 114 so as to prevent any gas from entering container 76c. Also such gas will find its way into conduit 96a where it will also close valve 110 so as to prevent movement of such gas into container 76a. Further, such gas in 96b will enter conduit 102 and by virtue of its pressure will close valve 104 so as to prevent any high pressure gas from mixing with a return flow in conduit 74 as will later be pointed out. Such gas or vapor as referred to will continue through line 116 and valve 120 which will be open under pressure and pass through conduit 118 into receiver 18 which is an insulated reservoir where the gas is stored under approximately 500 pounds pressure. When such reservoir 18 is up to the desired pressure, the gas can move through conduits 118 and 116 through the pressure regulating valve 132 which is designed to maintain a steady 400 pounds pressure for continuous delivery to the engine component 12. Gas moving in conduit 116 beyond the regulating valve 132 will divide into conduits 116a and 116b to enter chamber 40 of cylinder 30 where the relative pressure will be constant at all times. As seen in FIG. 1, the pistons 32 and 34 are shown as moving in a direction from left to right with the position of sleeve 44 being such that flow line 56 registers with groove 46 and flow line 64 is in communication with chamber 40. Also, outlet conduits 66 and 68 are in registration with groove 46. The movement of the pistons from left to right is accomplished by the high pressure gas in chamber 40 passing out of pipe end 64 to move through pipe 58 and into chamber 38 through conduit 60 whereby it acts on face 62 of piston 32. At the same time as the pistons are moving toward the right, gas in chamber 42 will be moving out of pipe end 52 through pipe 50 and through pipe end 56 to the groove 46 in sleeve 44 where it will be directed out of pipe end 66 through conduit 70 and into the condensing tubes 72. The passage of the gas through tube 72 will produce a condensing effect in a well known manner and such condensing working fluid will then return to containers 76a and 76c since the pressure will be sufficient to open valves 106 and 108. In the above cycle, with the piston assembly moved to the right to the end of the stroke and in position for return, reference is made to FIG. 2 where it will be seen that sleeve 44 has abutted stop 48 so that pipe end 56 of pipe 50 is now in communication with chamber 40 rather than groove 46 of sleeve 44 and pipe end 64 of conduit 58 is now in communication with the groove 46 rather than with chamber 40. In either position, either one or both of the outlet conduits 66 and 68 are in communication with the groove 46. For the return movement of the pistons, that is from right to left as seen in FIG. 2, the high pressure gas flowing into chamber 40 through conduits 116a and 116b will move out of chamber 40 through pipe end 56 and through conduit 50 and into chamber 42 through conduit end 52 as as to act upon face 54 of piston 34 and effect the movement of the pistons from right to left. As this occurs, face 62 of piston 32 will move the gas in chamber 38 out through pipe end 60, through pipe 58 and through pipe end 64 into groove 46 where it is exhausted through conduits 68, 70 and into the condensing chamber 72 for return to the combination heat generator and condensor assembly 16.

In the above operation, the pressure regulating switch 122 will periodically close valve 126 when appropriate pressure is reached in receiver 18 and will open valve 126 as the pressure in receiver 18 falls below its predetermined level.

Thus far described, it will be seen that working fluid in container 76b vaporized under heat from the water circulating system is stored under a predetermined pressure in receiver 18 to be delivered under a predetermined lesser but constant pressure to chamber 40 of the engine assembly and by the arrangement of the various flow communication means develops mechanical energy by action upon the pistons and it is continually returned through the condensor assembly 14 to the heat generating and condensing assembly 16. In this operation, only one of the containers 76a, 76b and 76c will be in operation at any given time and while such container is serving as a heat generator for the expansion of the working fluid therein, the returning fluid in a condensing cycle will be directed to the other two containers for purposes of further condensing.

Further in describing the operation of this engine, when the working fluid in container 76b has been fully vaporized so as to expose the sensing device 92b to a predetermined temperature of preferably 180° F. such device 92b acts to deenergize circuit 90b to valve 88b causing it to close and thus stop the further flow of hot water through jacket 78b. As can be seen in FIG. 3, the deenergizing of circuit 90b will close circuit 90a whereby valve 88a is open to permit the hot water from conduit 82 to enter jacket 78a and commence the heat generation of the working fluid in container 76a. As this occurs, the vaporized fluid in 76a will move through conduit 96a and because of the pressure present will open valve 110 whereby such gas will move through conduit 98, valve 120 and into receiver 18 as previously described. As this occurs, returning working fluid from condensing tubes 72 through conduit 74 will open valve 104 since the high pressure side will come from conduit 74 and thereby provide a return through line 96b into container 76b. With container 76a now operating as a heat generator, return working fluid through conduit 74 will also move through valve 106, through conduit 100 and into conduit 96c for return to container 76c but such return fluid will not pass through valve 108 because the high pressure side for closing the valve will be in line 96a. Thus, containers 76b and 76c at this time, being shut off from heat in lines 82 and 84 perform the function of a condensor as return fluid collects therein.

When the fluid in container 76a is fully vaporized as described relative to container 76b, the sensing element 92a acting through circuit 90a will close valve 88a to stop the flow of hot water into container 76a and at the same time circuit 90c will be activated whereby valve 88c is open to permit the flow of hot water into jacket 78c whereby container 76c begins the function of heat generation since in the meantime as described, return fluid has been flowing into containers 76b and 76c during the heat generation taking place in container 76a. At this time, the vaporized gas in container 76c will move through line 96c to line 98 through line 116, valve 120 and line 118 into the receiver 18 where it will maintain the supply of pressurized vapor for movement to the engine component 12 as previously described. Also during the heat generation cycle of container 76c, returning fluid through the condensing tube 72 and conduit 74 will move into the respective conduits 96a and 96b for return to the respective containers 76a and 76b. It will thus be seen that the respective conduits 96a, 96b and 96c serve as the outlet path for the vaporized fluid from their respective containers 76a, 76b and 76c during the heat generation cycle and as the return conduits during the condensing cycle for the fluid passing through the condensing tubes 72 and conduit 74. The various arrangement of valving as seen in FIG. 1 and as previously described is such that high pressure vapor moving out of the container which at the time is in a heat generating cycle is prevented by the check valve arrangement from entering any of the other two containers and moves only in conduits toward the receiver 18. Likewise, the two containers which at the time are in a condensing cycle are in appropriate flow communication because of the valving arrangement with the condensing tube assembly 72. Thus while the several containers 76a, 76b and 76c are each a combination heat generation and condensing unit, they function in the capacity of a heat generator only in a predetermined successive sequence and not simultaneously for that purpose and by such an arrangement receiver 18 is efficiently supplied and maintained with a supply of the vaporized fluid at the desired pressure so as to afford a constant source of supply to the engine component 12.

As indicated previously, the work load used in illustrating this engine is the air conditioning apparatus 20 and, as shown, the compressor 24 is attached in any suitable manner to cylinder 30 so that the compressor piston 134 can be operatively connected to piston rod 36 of the engine component 12. For purposes here, assuming that this apparatus is being adapted particularly for the auto air conditioner, we have shown piston 132 attached to an integral extension of rod 36 which I have designated as 36'. It will be understood, however, that rod 36' can be a separate component and suitably coupled to rod 36 in any appropriate manner. With compressor 24 thus attached to the engine component 12, the reciprocation of pistons 32 and 34 will correspondingly reciprocate piston 134 which acts relative to the several check valves to move the air conditioning fluid between the evaporator 22 and the condensor 26 all in a well known manner and for which no invention is claimed per se. For purposes of this vehicle air conditioner, a thermostatic valve 136 is operatively associated with the evaporator 22 and the regulating valve 132 so that operation of the engine component 12 can be regulated according to predetermined requirements of temperature in the evaporator.

In the use of this new engine for operating a motor vehicle air conditioner as described, it will be appreciated that the initial energy required for the operation of the heat generator 76a, 76b and 76c is supplied solely from waste heat that is generated by the vehicle engine in its water cooling system. Consequently, the utilization of this heat results in no drag or load on the vehicle engine nor requires any mechanical connection thereto by any belts or pulleys and, at the same time, provides for the adequate operation of the air conditioning unit 20. This makes it possible to safely operate the air conditioning unit not only at slow speeds but in slow moving traffic and even when the vehicle is at a standstill so long as the vehicle engine is operating and its water circulation system is functioning. Under such an arrangement, it will be appreciated that the air conditioner operates with the same lack of effect and load on the vehicle as does the ordinary vehicle hot water heater. With the air conditioning system thus relieved of mechanical connection to the vehicle engine, the load on such engine is materially reduced and its operation becomes considerably more economical.

It is submitted that the invention shown and described is aptly suited to achieve the purposes intended and is characterized by a combination of highly useful and mutually cooperating elements that combine their respective and proportionate functions in accomplishing the object sought to be obtained.

I claim:

1. An engine assembly operated by pressure differentials created in a closed vaporized fluid circuit, comprising:

a closed container for a working fluid, a source of heat to act on said container to vaporize the working fluid therein, control means for selectively opening and closing said source of heat to said container whereby when said source of heat is open, said container serves as a vapor generator, temperature responsive means within said container operatively associated with said control means to open and close said source of heat to said container at predetermined temperatures, a vapor storage reservoir for receiving superheated vapor from said container when it is serving as a vapor generator, a pressure regulating valve on said reservoir operatively connected to said control means to maintain a predetermined pressure in said reservoir and effect the closing of said source of heat to said container according to predetermined pressure limits within said reservoir, an engine assembly, a predetermined pressure regulated flow means between said engine assembly and said reservoir whereby said engine assembly converts heat energy from said vaporized working fluid to mechanical motive power, a condensor assembly, flow means in said engine assembly for exhausting vapor to said condensor assembly, and a valved flow means for transferring said working fluid from said condensor assembly to said container when said source of heat thereto is closed whereby said container serves as a condensing unit until said source of heat thereto is opened.

2. Apparatus as defined in claim 1 including:

said source of heat being a closed circuit how water circulating means, and a water jacket encasing said container and disposed in flow communication with said circulating means.

3. Apparatus as defined in claim 1 in combination with a motor vehicle air conditioner wherein said motor vehicle includes an engine cooling fluid circulating system and said air conditioner includes a compressor, an evaporator, a condensor and a receiver, said apparatus including:
- a jacket encasing said container and disposed in flow communication with said engine cooling fluid circulation system whereby waste heat from said circulation system is utilized as said source of heat, and
- means operatively connecting said engine means to said compressor whereby said compressor is operated by the motive power converted from the heat energy of said working fluid.

4. A power system operated by pressure differentials created in a closed circuit for vaporizing and condensing a working fluid, comprising:
- a first and second closed container for a working fluid,
- a source of heat to act on said containers to vaporize the working fluid therein,
- control means for opening and closing said source of heat to said containers whereby said containers when opened to said source of heat serve as a vapor generator,
- temperature responsive means within said containers operatively associated with said control means whereby when heat is supplied to one container it is closed to the other container and at predetermined temperature limits, the open and closed relation of the source of heat to said containers is reversed,
- an engine assembly,
- valve flow communication means between said engine assembly and said respective containers whereby said engine means converts heat energy from the container serving as a vapor generator into mechanical motive power,
- a condensor assembly,
- flow means in said engine assembly for exhausting vapor to said condensing assembly, and
- a second valved flow communication means for transferring said working fluid from said condensor assembly to that container which at the time is closed off from the source of heat and is in that condition serving as a condensing unit.

5. A power system as defined in claim 4 which includes:
- a vapor reservoir for receiving superheated vapor from said respective containers when they are serving as a vapor generator,
- said reservoir disposed intermediate said engine assembly and said containers and interposed in said flow communication means,
- a pressure regulating valve on said reservoir operatively connected to said control means to maintain a predetermined pressure in said reservoir and effect the closing of said source of heat to said containers according to predetermined pressure limits within said reservoir, and
- a predetermined pressure regulated flow means between said engine assembly and said reservoir.

6. A power system as defined in claim 4 which includes:
- said source of heat being a closed circuit hot water circulating means, and
- a respective water jacket encasing said containers and disposed in flow communication with said circulating means.

7. A power system as defined in claim 6 which includes:
- said control means being separate solenoid operated valves in said flow communication means associated respectively said respective containers, and
- said temperature responsive means being electrically connected to said valves whereby only one of said valves is open at any given time.

8. A power system as defined in claim 4 in combination with a motor vehicle air conditioner wherein said motor vehicle includes an engine cooling fluid circulation system and said air conditioner includes a compressor, an evaporator, a condensor and a receiver, said apparatus including:
- a respective jacket encasing said containers and disposed in flow communication with said engine cooling fluid circulation system whereby waste heat from said circulation system is utilized as said source of heat, and
- means operatively connecting said engine means to said compressor whereby said compressor is operated by the motive power converted from the heat energy of said working fluid.

9. A method of converting heat energy to mechanical energy comprising the steps of:
- providing a closed container for a working fluid,
- applying heat to said container to vaporize said working fluid,
- storing the vaporized working fluid in a pressure regulated reservoir,
- transferring the vaporized working fluid to a work producing device,
- closing off the heat to said container at a predetermined pressure in said reservoir,
- exhausting vapor from said work producing device, condensing the same and returning it to said container when said container is not receiving heat, and
- continuing the condensing of said vapor in said container until heat is again supplied thereto to vaporize the working fluid.

10. A method of converting heat energy to mechanical comprising the steps of:
- providing a plurality of closed containers for a working fluid,
- applying heat to said containers on a regulated cycle so that only one container receives heat at any given time,
- transferring the superheated vapor from the container receiving heat to a work producing device,
- exhausting vapor from said work producing device, condensing the same and returning it to said containers not at the time receiving heat,
- continuing the condensing of vapor returned to containers free of heat, and
- transferring the application of heat between containers in a successive cycle at predetermined intervals to maintain a supply of superheated vapor for continual transfer to said working device and to utilize all containers but the one receiving heat for condensing vapor returned from said working device.

11. A method as defined in claim 10 which includes:
- maintaining a stored supply of superheated vapor for continuous delivery to said working device, and regulating the application of heat to said containers according to a predetermined pressure of said stored supply of superheated vapor.

12. A method as defined in claim 10 which includes regulating the successive transfer of the application of heat between containers according to predetermined temperature limits within the container receiving heat at any given time.

* * * * *